July 3, 1962 K. B. BREDTSCHNEIDER 3,042,359
VALVE SEAT AND DISC ARRANGEMENT
Filed Sept. 22, 1959 6 Sheets-Sheet 1

Inventor,
Kurt B. Bredtschneider.
By Joseph O. Lange
Atty.

Inventor.
Kurt B. Bredtschneider.
By Joseph O. Lange
Atty.

July 3, 1962  K. B. BREDTSCHNEIDER  3,042,359
VALVE SEAT AND DISC ARRANGEMENT
Filed Sept. 22, 1959  6 Sheets-Sheet 3
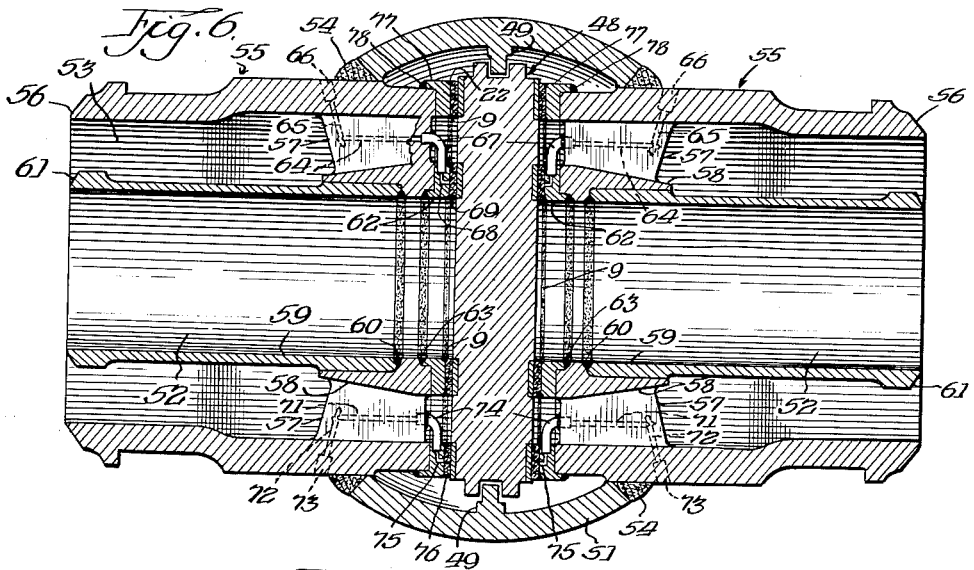
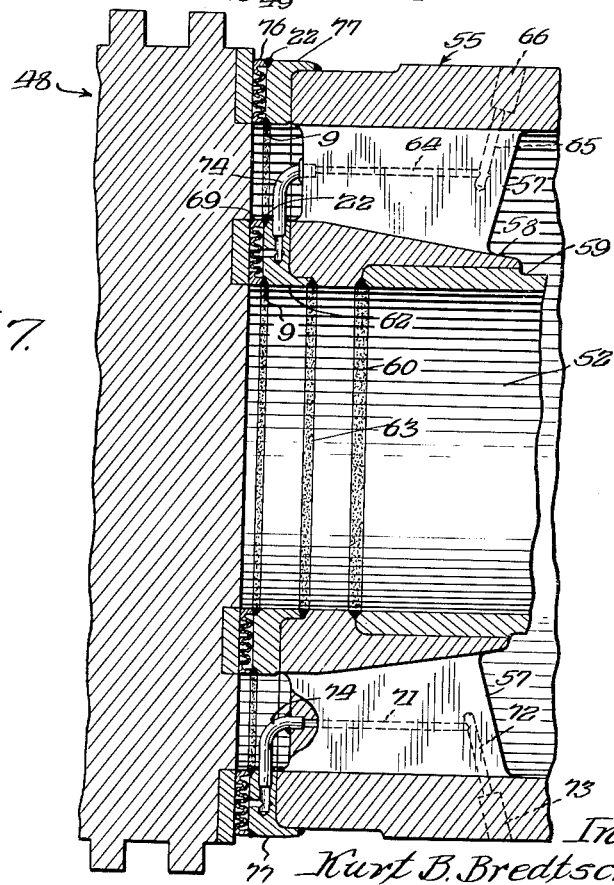
Inventor:
Kurt B. Bredtschneider
By Joseph O. Lange
Atty.

Inventor.
Kurt B. Bredtschneider.

July 3, 1962

K. B. BREDTSCHNEIDER 3,042,359

VALVE SEAT AND DISC ARRANGEMENT

Filed Sept. 22, 1959

Inventor.
Kurt B. Bredtschneider.
By Joseph O. Lange
Atty.

July 3, 1962 K. B. BREDTSCHNEIDER 3,042,359
VALVE SEAT AND DISC ARRANGEMENT
Filed Sept. 22, 1959 6 Sheets-Sheet 6
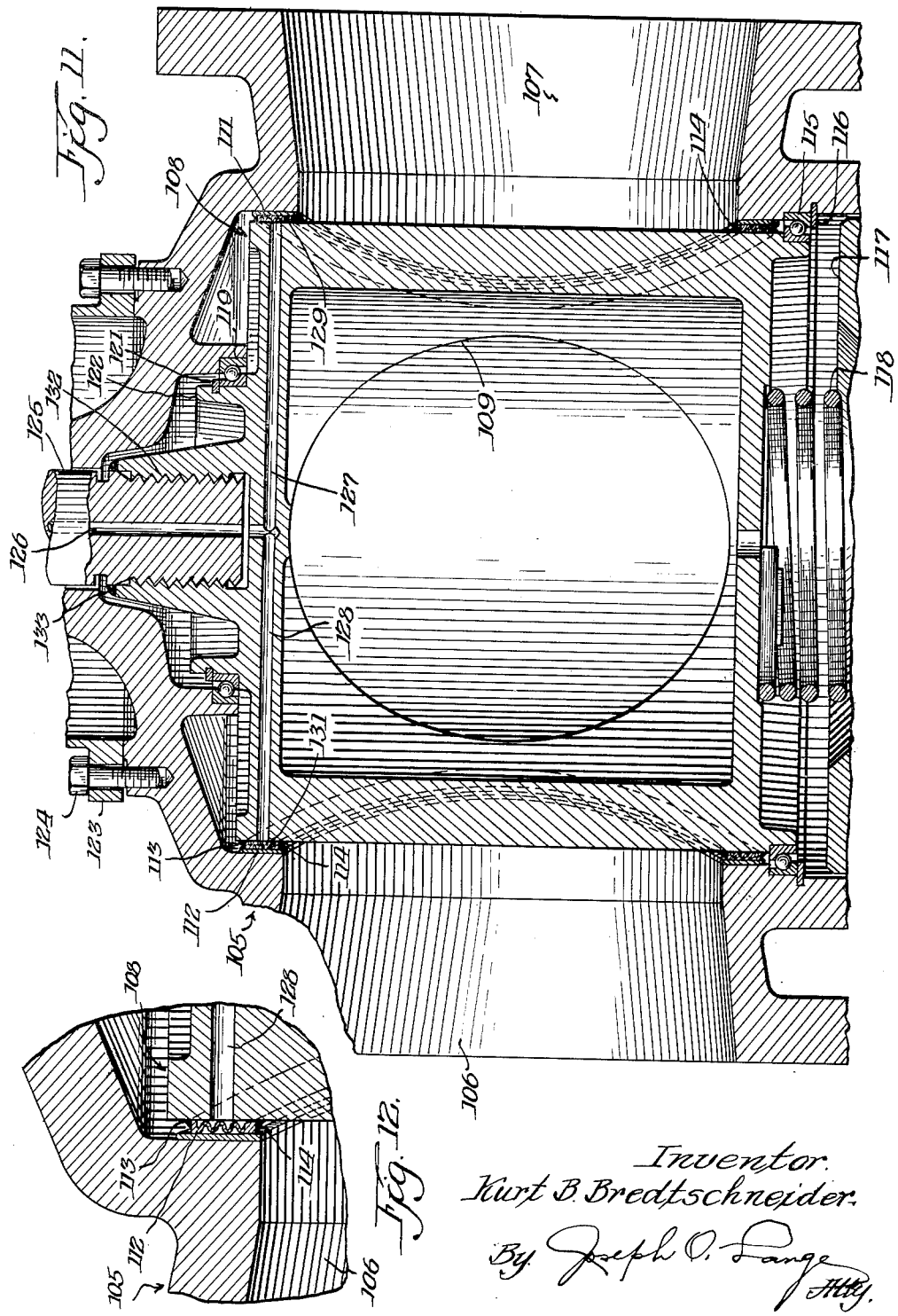
Inventor.
Kurt B. Bredtschneider.
By Joseph O. Lange
Atty.

United States Patent Office 3,042,359
Patented July 3, 1962

3,042,359
VALVE SEAT AND DISC ARRANGEMENT
Kurt B. Bredtschneider, Chicago, Ill., assignor to Crane Co., Chicago, Ill., a corporation of Illinois
Filed Sept. 22, 1959, Ser. No. 841,522
5 Claims. (Cl. 251—172)

This invention relates generally to valves, and more particularly to a novel form of sealing means for valve seat and closure member in which an outwardly deflectable corrugated membrane member is employed for at least one of the seating outlets.

At the outset, in order to have a better appreciation of the background of this invention, it should be appreciated that where valves are employed on high temperature service coupled with relatively high pressures, it has frequently occurred that distortion of the valve parts will take place due to the occurrence of a non-uniform temperature expansion of the valve setting up objectionable stresses. Frequently, under the stresses of such high temperatures, deformation of the valve body and closure will also occur due to the strains created by the piping installation itself and upon which the valve is supported. It can readily be understood that with the occurrence of such distortion, serious seating problems will also take place such as galling, tearing, or knitting of the metals of the seating area. Accordingly, excessive sticking of the valve in the closed position has also resulted.

It is, therefore, one of the more important objects of this invention to provide for a valve fluid tight sealing construction in which the interposed seating means, such as the corrugated membrane, is preferably of generally annular form and is made sufficiently flexible and optionally inflatable to provide that the valve moving part, such as a gate closure member, is not in direct, abutting or sliding contact with the valve seat or the membrane thereon, if such is employed, during the course of effecting valve operation from open to closed position and vice versa.

Specifically considering the structural arrangement in use, in the end or closed position of the valve, a flexible diaphragm ring having a plurality of serrations is secured to the movable valve closure member, such as the valve disc or valve gate, or even to a rotating or plug valve, or to the valve seat itself. The diaphragm with its serrations is deflected outwardly from the inside by an independent source of fluid pressure of greater magnitude than the fluid pressure in the pipe line upon which the valve is mounted. It has been found that the deflection of these multiple serrated members outwardly and against the casing seat or seat shoulder provides an unusually efficient and tight contact easily applied between the shut-off members in the valve closed position. It will be appreciated that with a plurality of serrations in the membrane member the opportunity for effecting fluid tightness is greatly increased.

Before the valve is opened, it is desirable to deenergize and to deflate these flexible members so as to break the fluid tight contact with the valve seat or closure member. Thus, it is another object to provide a design in which the valve moving part is not in contact with the seat during the valve operation.

Another important object is to provide for a construction in which exceptionally good flexibility in a plurality of contacts of the serrated membrane rings can follow even a relatively distorted contact area and still maintain a membrane wall thickness without objectionable deformation to withstand the required higher pressure applied to the said membranes.

Another important object is to provide for a construction in which a type of membrane can be used which can be relatively cheaply and easily made by simply cutting concentric grooves on the outside and the inside of these rings selected for the membrane function.

Another important object is to provide for a construction in which a segregated cross section of the membrane ring is preformed and which in the deflected position several concentric contact areas can be made with separate relatively high unit areas of contact insofar as the valve tightness is concerned. It will later become apparent that in some cases even an annular line bearing may be provided to enhance valve seat tightness.

Another important object of this invention is to provide for a type of membrane ring construction in which the outside and inside diameters of the respective rings used have a relatively thick cross section whereby to enable the making of a strong weld connection with the valve closure member or with the valve casing or body seating area thereby to withstand the greater difference in pressure applied in order to effect valve tightness.

Another object is to provide for a valve in which the seating construction enables its use on critical or severe services, such as hot gases or the like fluids.

Other objects and advantages will become more readily apparent upon proceeding with the following description read in light of the accompanying drawings, in which:

FIG. 6 is a transverse sectional assembly view of a double duct or ported valve with a pair of shut-off seats on the upstream and downstream sides of the valve for contact by the sliding disc or gate in the open and closed valve position;

FIG. 7 is a magnified fragmentary sectional view in the same plane referred to in FIG. 6;

Figure 1:
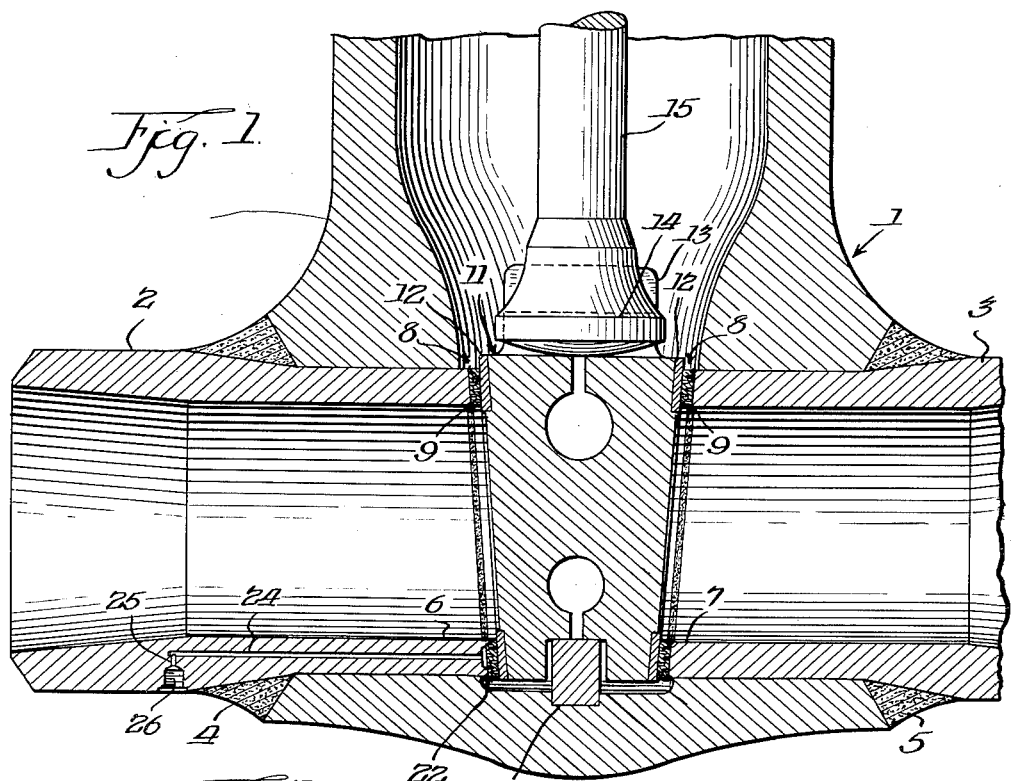
FIG. 1 is a fragmentary sectional assembly view of the invention applied to a wedge gate valve.

FIG. 11 is a modified form of construction in which a rotating plug valve is used whereby flexible membrane rings are mounted on each side of the plug and are welded thereto so as to surround the inlet and outlet openings of the valve upon 90 degrees rotation of the plug to the closed position shown; and FIG. 12 is a magnified fragmentary sectional view of the fluid feed duct and membrane arrangement employed in connection with FIG. 11.

Similar reference numerals refer to similar parts throughout the several views.

Referring now to FIG. 1, a fabricated type of gate valve casing, generally designated 1, is shown in which oppositely disposed end inserted seats 2 and 3 are employed annularly welded respectively at 4 and 5 to the casing 1. At their innermost annular end portions, as at 6 and 7, respectively, each of the said seats is provided with the novel multiple serrated membrane member generally designated 8 and attached thereto as by means of the annular welds 9. The multiple serrated membranes 8 on their oppositely disposed surfaces thus frictionally engage the reciprocally movable valve closure gate generally designated 11 preferably making such contact with the hardened seat facing 12 in the valve closed position illustrated. While mention has been made of a fabricated valve casing, it will of course be appreciated that integral cast body or casing may be employed without affecting the scope of the invention as hereinafter described.

Figure 2:
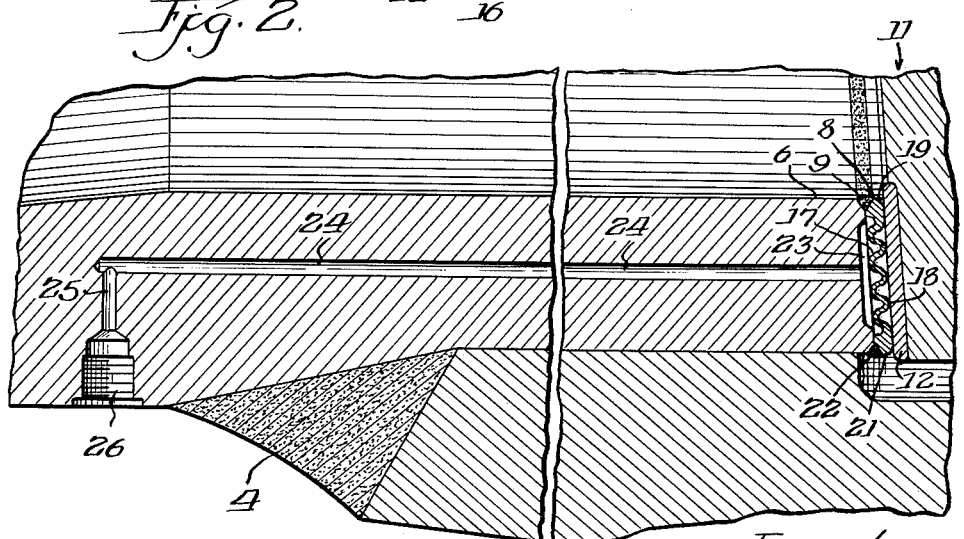
FIG. 2 is a magnified fragmentary sectional view of the seating construction employed in FIG. 1.

The valve closure member 11 is provided with the usual upwardly extending hook portions 13 for engagement by the T-head 14 of the reciprocally movable valve stem 15. A suitable inserted guide 16 of U-configuration assists in holding the valve closure member 11 against substantial transverse movement during the course of its movement between open and closed valve positions. As more clearly shown in FIG. 2, the membrane ring 8 of this invention consists of a plurality of annularly arranged concentric serrations and undulations 17 and 18 respectively. At the inner periphery thereof, such as 19, and also at the outer periphery as at 21, the membrane ring is substantially thickened to provide for the weld connection at 9, as previously mentioned, and at 22, thereby to provide a sturdy and durable connection for sealing the annular chamber 23 having communication with the feed ducts 24 and 25 and the fluid pressure application connection indicated at 26. At the same time, a fine degree of flexibility in response is imparted to the seat contact through the serrations. It will, of course, be understood that the medium used in transmitting fluid pressure to the underside of the membrane 8 may be either a lubricant, such as grease or oil, or other suitable fluids, depending upon the nature of the temperature and pressure conditions encountered insofar as the main valve surface contact is concerned.

With the valve gate in the closed position as shown, the closure member 11 will be raised in the usual manner by suitable actuating means (not shown) applied to the valve stem 15. However, it should be understood that before such closure member lifting operation takes place, the fluid pressure heretofore applied through the ducts 24 and 25 and communicating with the membrane annular chamber 23 will be relieved, thereby breaking the fluid sealing contacts of the annular raised portions of the serrations 18 constituting the valve fluid sealing means on the membrane 8. It will be clear that two things are accomplished in such membrane deflation occurring upon said release of the fluid pressure from the underside of the said membrane. The high unit load of the seating contact will be relieved and the membrane 8 will be released and withdrawn to the extent of allowing an annular clearance to exist between the valve closure member seating portion 12 and the said membrane as the closure member starts its movement upwardly in opening the valve. Thus, any tendency for the usual rubbing causing abrasion or galling to occur in the seat metals as in valves of prior construction is now avoided. The desirable result attained is that the seat contact areas between the valve closure member 11 and the membrane 8 are undisturbed insofar as objectionable marring of the valve seats by the action of the closure member taking place is concerned. At the same time, it must also be apparent that the advantages of a plurality of annular contacts formed by the raised serrations with the closure member makes it comparatively easy to maintain a fluid tight valve condition. For valves installed on critical or severe services, it will be appreciated that it is necessary that absolute tightness must be relatively easily obtained and also maintained. The several concentric thin line contact areas provided by the membrane serrations 18 assist materially in preserving a high unit load at separated annular areas of substantially line bearing proportions. The tight seating of the valve is effectively and also very easily accomplished.

Figure 3:
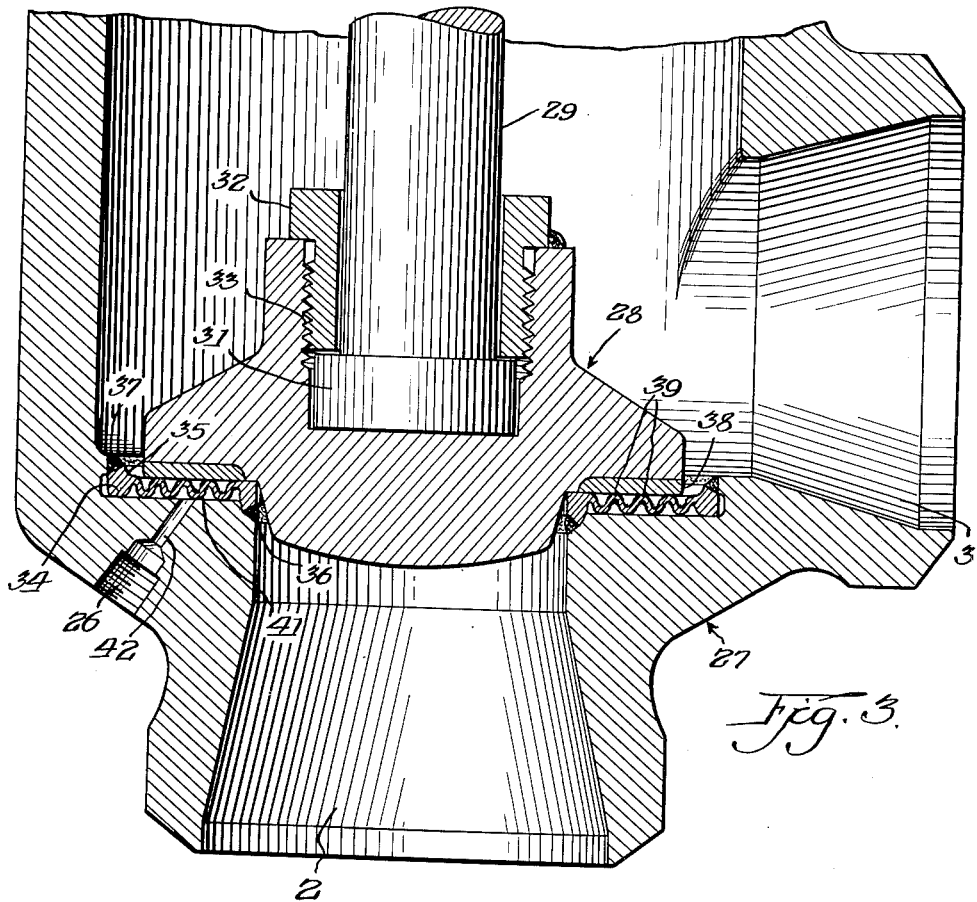
FIG. 3 is a fragmentary sectional assembly view of the invention applied to an angle stop valve.

Referring now to FIG. 3, an angle type of valve is shown in fragmentary sectional assembly in which the valve casing generally designated 27 is provided with the usual inlet and outlet 2 and 3 respectively for attachment to a pipe line (not shown). In this case, it will be appreciated that the reciprocally movable closure member generally designated 28 is of the stop valve type and is actuated by means of a reciprocally movable valve stem 29 having a T-head connection 31 and swivelably held to the closure member 28 by means of the disc stem ring member 32 threadedly attached to the closure member as at 33. In this construction, it will be noted that the valve casing 27 immediately adjacent the seat opening 2 is recessed as at 34 to receive the membrane ring designated 35. The latter member is attached as at 36 and 37 respectively to the said recessed portion 34 of the casing 27. As in FIGS. 1 and 2, the closure member 28 preferably, but not necessarily, is provided with the hardened seat facing member 38 for effecting the fluid sealing contact with the serreated portions 39 of the membrane 35. Here, similarly, the under portion or chamber 41 immediately below the said membrane communicates by means of a supply duct 42 with the fluid pressure connection 26 introducing the fluid in much the same manner as described in detail in connection with FIGS. 1 and 2. Under such circumstances as previously referred to with the valve shown in the closed position illustrated, should it became necessary to increase the degree of unit load applied at the serrations 39 bearing against the seating portion 38 of the closure member 28, all that is necessary is to attach a suitable pressure applying device, such as a lubricant gun, for example. By virtue of the deflection of the serrations that takes place, the unit load against the closure seating portion 38 will be materially increased, thereby assuring valve tightness even under extremely severe or critical fluid pressure temperature conditions. It will also be noted that in the same manner as described and for the same reasons as set forth in connection with FIGS. 1 and 2, the membrane 35 is substantially thickened on its inner and outer peripheral portion. Thus, the quality of the lower and upper welds 36 and 37 respectively is not impaired when effecting such welded connection, nor are the serrations 39 adversely affected by heat applied. At the same time, the desirable flexibility exercised at the closure ring in easily making a fluid tight connection under the influence of the fluid pressure supplied at 26 through the duct 42 is not minimized.

Figure 4:
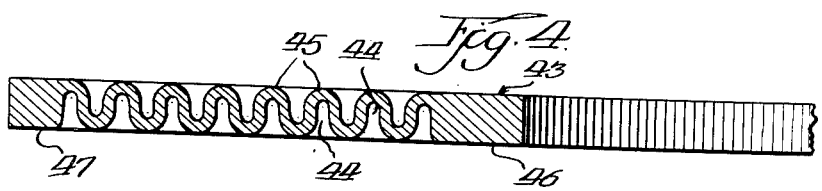
FIGS. 4 and 5 are detailed sectional views of modified membrane members employed.
Figure 5:
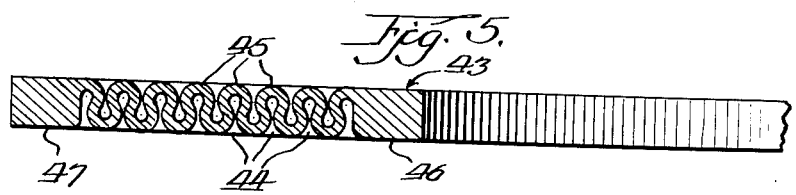

Referring now to FIGS. 4 and 5, a variety of forms of membrane rings is illustrated in magnified cross section. It will be appreciated that the ring generally designated 43 in FIG. 4 is made either by machining the grooves 44 of the serrations 45 by the usual machining methods, such as a rake type of cutter, or else forming by pressing in a suitable die to the desired cross-sectional configuration ultimately sought. Under some circumstances, this construction of membrane with its relatively spaced apart serrations may be suitable for certain fluid sealing services and the usual thickened portions at 46 and 47, inner and outer peripheries respectively may be dimensioned to suit the requirement of the installation.

Or, as shown in FIG. 5, the same ring shown in FIG. 4 may be machined to the dimensions above described in that figure and then suitably shaped to the final form illustrated in FIG. 5 by a hot or cold forming method, as selected, to reduce the overall span of the membrane 43 as well as the annularly formed distances between the grooves 44 and the serrations 45. In this case, the respective thickened portions at 46 and 47 may be reduced or else increased in width depending upon the type of the casing recess in which the membrane 43 is to be received and mounted. The important feature here to appreciate is that by a simple machining or other forming of the membranes and subsequently compressing and forming to the final desired shape, a large variety of membranes may be used without expensive modification of the valve being necessary.

Figure 9:
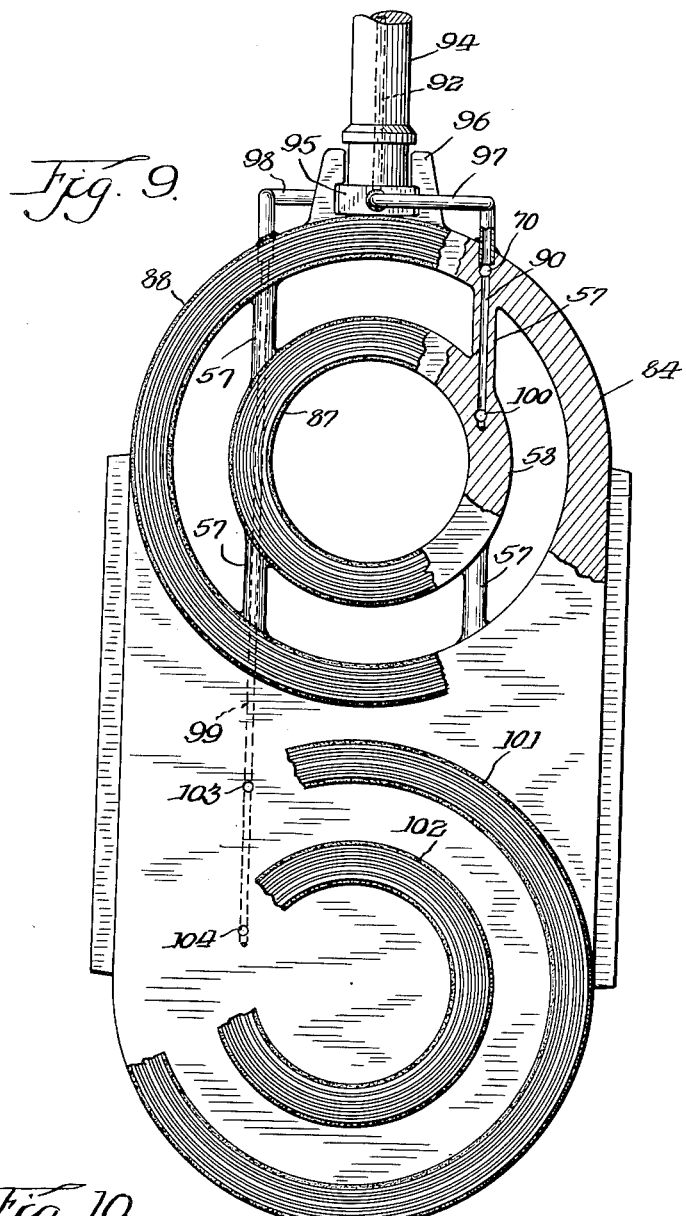
FIG. 9 is a transverse end view in partial section of the fluid pressure applying duct arrangement illustrated in FIG. 8.
Figure 10:
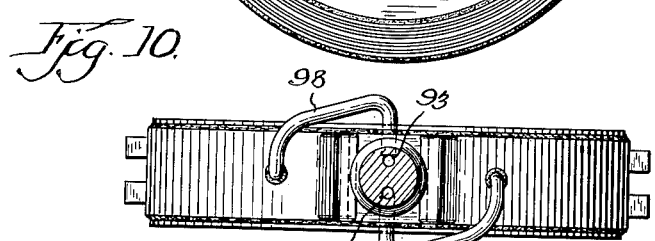
FIG. 10 is a fragmentary plan elevation of a portion of the duct arrangement applied to the closure member shown in FIG. 9.

Referring now to FIG. 6, the valve, generally designated 48, is known to the trade as a double duct valve with two shut-off seats on each side of the sliding gate or disc generally designated 48, as shown. In this case, the valve moves reciprocally on the oppositely disposed guides 49 of the valve casing 51. It is the type of construction in which the inner valve passage or port 52 may be carrying one fluid, for example, while the other conduit 53 may be transporting another fluid in a special processing operation requiring such an arrangement of concurrent conveyance of fluids. In some instances, the fluid carried in the conduit 53 may be a cooling or heat exchange medium for the fluid being carried within the conduit portion defined by the passage 52. Or, in other cases, the same fluid but at different pressures and/or temperatures may flow through the concentric conduits. Obviously, all of the fluid arrangements may be varied to meet the many applications encountered in the field of service. In some cases, (although not shown), insulation may be suitably applied as a heat barrier between the inner passage and the surrounding annular passage or conduit. The valve casing is arranged by means of the annular welds 54 so as to support the double seating portions generally designated 55, having at their outer end limits suitable connections at 56 for attachment to a pipe line and having between the radially extending spaced-apart struts 57 for supporting the valve inner seat portions 58, the latter being recessed to receive the respective inner conduits 59 providing the passages 52 and being welded annularly as at 60. Note that the struts 57 may extend vertically as shown in FIG. 9, rather than radially as above stated, without affecting their proper functioning. The inner conduits 59 are similarly provided with the end connections 61 for attachment to a pipe line (not shown). The usual annular welds may be employed as at 60 and 63 to attach the inner conduit 59 to the inner annular member 58 centered and supported by said struts. Preferably, although not necessarily, an inner seat portion of annular configuration at 62 is positioned in weld sealed attachment as shown to the annular portion 58.

It should be noted that the struts 57 are preferably made of sufficient wall thickness to permit their receiving the fluid pressure supply ducts 64 and 65 having connection with a suitable outside source to a source of fluid pressure such as a pump (not shown) by means of the pressure applying conduit connection 66 to a fluid pump (not shown). As shown, the ducts 64 and 70 have at their inner ends the elbows 67 communicating with the ducts 68 leading to the respective underside areas of the inner membrane 69 in the same manner as described in connection with the previous figures and for the same purpose. The outer peripheral contact area with the closure member 48 is effected by means of the fluid pressure inlet supply ducts 71 and 72, having their communication with the connection 73 for attachment of a pressure applying device as previously referred to. At the inner end of the duct 71, an elbow 74 is mounted, communicating with the outer annularly formed angular duct 75, leading to the underside of the outer membrane 76. The latter member has the predetermined deflectable contact under fluid pressure influence with the closure member 48 in the same manner as described in connection with the previous figures.

It will be noted that the casing end connecting portions 55 at their inner limits are received within the recessed seats 77 and upon which the outer membrane 76 is mounted by means of the annular welds 22 and 9, the seat members 77 preferably being weld sealed as at 78 to the end connecting portions 55. Thus, in this construction, it will also be apparent that the means of applying the fluid pressure to the inner and outer membranes 69 and 76 respectively are accomplished by the suitable fluid pressures applied at 66 and 73. In this application of the invention, the closure member 48 will likewise be moved reciprocally to open the valve only after the fluid pressure applied at 66 and 73 has been withdrawn from behind the respective membranes 69 and 76 so as to avoid any occasion for the valve damaging, rubbing, abrasion, or galling referred to in connection with the previous figures.

Figure 8:
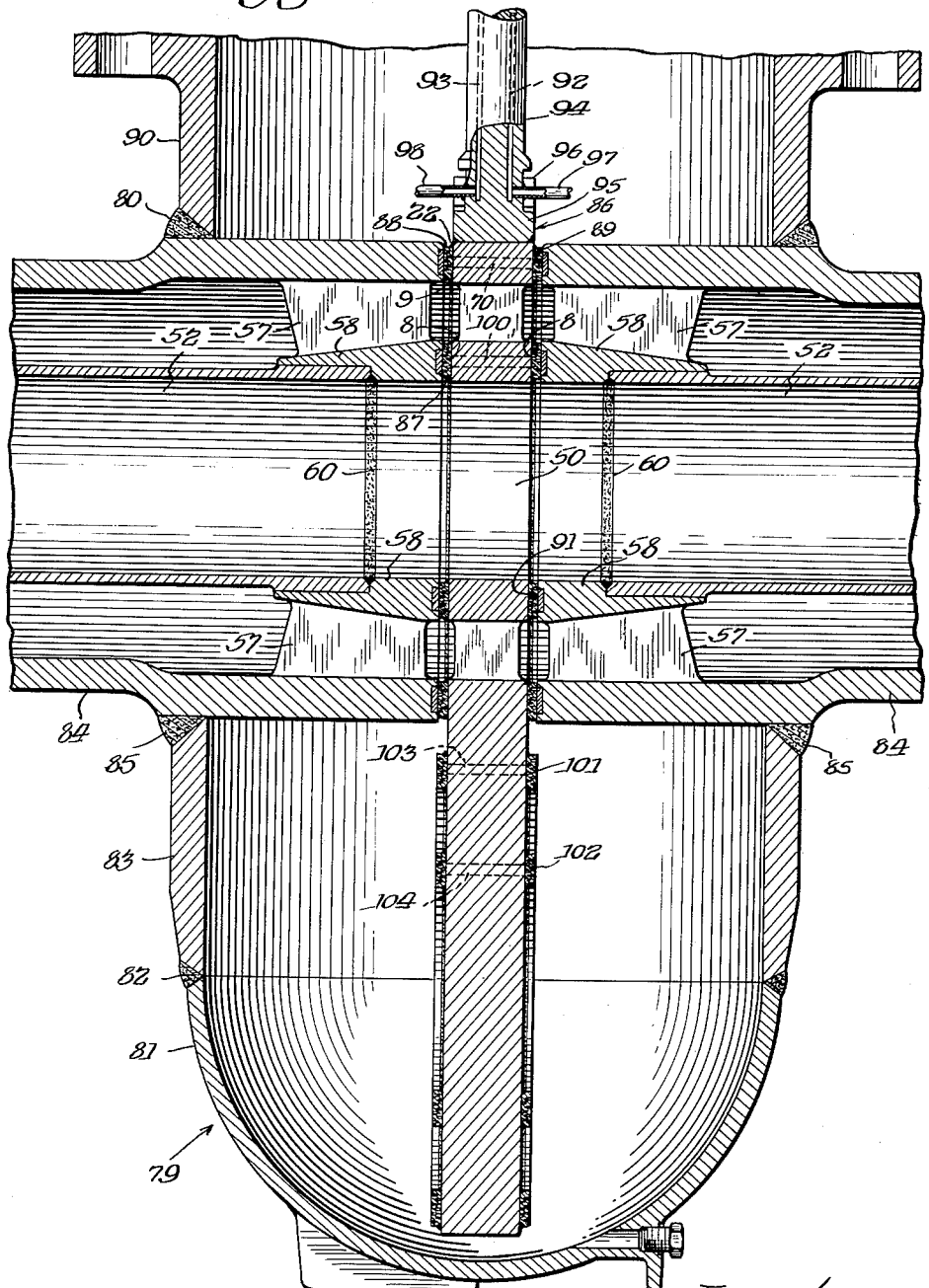
FIG. 8 is a modification of the construction referred to in FIGS. 6 and 7 in which the flexible membranes are attached to the sliding disc and are inflated and deflected through fluid supplied through a hollow valve stem or spindle.

Directing attention now to FIG. 8, where, in contrast to the construction shown in FIGS. 6 and 7 in which the fluid pressure applied to the underside of the membrane 76 and 69 forms pressure connections fixed to the casing and then passes through the fluid ducts 64 and 71 through the radially extending struts 57. In the instant construction, while the general arrangement of this valve follows the pattern of FIGS. 6 and 7, the means for applying the fluid pressure to the membranes is through a hollow valve stem as will hereinafter become more readily apparent.

The valve is known as the conduit gate type and the casing, generally designated 79, consists of a lower chamber portion 81, suitably welded at 82 to the cylindrical portion of the body or casing portion 83, the latter portion being welded to the oppositely disposed tubular seats 84 by means of the annularly extending welds 85, the upper bonnet portion 90 being joined to each of the seat inserts 84 and casing 83 by means of the weld 80. In this construction, the slidably movable valve closure member generally designated 86 carries the inner and outer serrated membranes 87 and 88 respectively weld sealed thereto at 22 and 9 respectively. In this construction, the respective serrated membrane members make contact with the inner end portions of the double conduit portions at 89 and 91. As stated, since the valve construction follows the general construction of that disclosed in FIGS. 6 and 7, it is deemed unnecessary to describe the valve in greater detail, except that since the closure member carries the membrane members, it is necessary in this construction to provide the hollow feed ducts 92 and 93 for delivering the fluid pressure to the underside of the serrated membranes 87 and 88 for the purpose hereinabove described. In this construction, the hollow stem 94 is provided with the T-head 95 engaging the relieved hook portions 96 of the closure member 86. The respective fluid feed ducts 92 and 93 are provided with the fluid conveying conduits 97 and 98 for attachment to the respective depending conduits, as more clearly shown in FIG. 9, thereby to make connection with the serrated membranes 87 and 88. Also by means of a vertically disposed extension duct 99 in the struts 57, communication is made with the underside of the lower concentric membranes 101 and 102 by means of the outlets 103 and 104 respectively. This fluid distribution provision is of course important in such cases in which the conduit type of valve as illustrated may be either in the open position as illustrated in FIG. 8 to provide the fluid tight seal of the respective membranes 87 and 88. When the valve is in the closed position, the fluid distribution allows for the membranes 101 and 102 to be expanded and similarly to provide for a fluid sealing contact with the respective seats on the inner end of the members 84 and 58 in the valve open position.

It will, of course, be appreciated that at its upper end the hollow valve spindle 94 is provided with similar connections (not shown), but identical to those indicated at 66 and 73 respectively in FIGS. 6 and 7 to effect the same inflation of the annular serrated membranes depending upon whether the valve is in its closed or open position.

It will be appreciated that the ducts 97 and 99 are indicated as extending through the struts 57. However, they may be made of separate tubes not housed within the struts 57. The important feature here is that the valve enjoys a flexibility insofar as the application of fluid pressure is concerned which previous conduit valves have not possessed, and which at any stage of valve operation can be applied through the hollow valve stem, regardless of whether the valve is in open or closed position. While the invention has been described in connection with a double duct valve with two shut-off seats on each side of the valve in open and closed positions, it will, of course, be appreciated that a conventional single disc conduit type of valve may employ the invention without departing from the scope of the invention.

Referring now to FIG. 11, in which a rotary plug valve generally designated 105 is shown with the usual end connections 106 and 107 for attachment to a pipe line. In this case, the rotary plug, generally designated 108, is ported as indicated at 109 and flexible membrane rings 111 and 112 are suitably curved and welded at 113 and 114 to the outer periphery of the plug 108 as shown. The plug is preferably of the cylindrical type and is held within the body by means of the thrust bearing 115 mounted upon the split washer 116 and held within a cap 117 resiliently by means of a coiled spring 118 to bear against an upper thrust bearing 119, the latter being held against end movement by means of the split washer 121 within the annular extension 122 of the plug 108.

A cap 123 by means of bolts 124 serves as the journalling means for the stem actuator 125, the said actuator being hollow to provide a duct 126 supplying fluid pressure through the radially extending ducts 127 and 128 to the underside of the respective membranes 111 and 112, thereby to complete the latter members to bear snugly against the respective seating contacts 129 and 131, thereby to increase the intensity of the unit pressure load applied at the annular seating tension when the valve is in the closed position. It will, of course, be appreciated that the duct 126 is connected in the same manner as described in connection with the previous figures with a suitable source of fluid supply, such as that used at 66 and 73 described in connection with FIGS. 6 and 7. The stem is connected preferably by means of the threads 132 to the valve plug 108 and is preferably weld sealed as indicated at 133. Here, again, the principle of increasing the unit seating load in the valve during the closed position applies to a rotary type of plug valve in a different manner of construction by employing the same principle of a plurality of concentric serrations on a membrane making contact annularly with the cylindrical bore of the body 105 and thereby increasing the effectiveness of the valve tightness. One even the most severe services, the significant element here is that the fluid pressure used behind the respective diaphragms in all cases must be sufficient to counteract and overcome the effects of line fluid pressures being carried within the valve itself.

While a number of embodiments have been illustrated and described, this has only been done to show that the invention insofar as valves generally are concerned may be applied to a number of different varieties of valves. Therefore, the actual scope of the invention should be viewed in light of the appended claims.

I claim:

1. In a valve, a valve casing, a movable valve closure member therefor, seat means within the casing for contacting the said closure member with the said seat means in fluid sealing relation, sealing means interposed between said closure member and the seat means of the said casing, the said sealing means comprising inflatable membrane means having spaced apart inner and outer thickened annular portions defining peripheral limits thereof, the said membrane means having a plurality of intermediate thin walled serrations comprising successive concentric lands and recesses joining said annularly spaced apart thickened portions and extending annularly between said thickened annular portions substantially transversely to the central axis thereof, the latter thickened portions defining the respective inner and outer peripheral limits of said inflatable membrane, the said thickened portions also defining an annular closed chamber on one side of the said membrane means when the latter means is assembled in the casing, the closed chamber being fluid sealed on outer peripheral surfaces adjoining said thickened annular portions of the membrane means, actuating means cooperating with the closure member for effecting said fluid sealing contact predeterminately between said valve closure member and the said seat means, the said closure member in its valve closing contact within said casing bearing against outer surfaces defining respectively the lands of the said serrations and at least one outer transverse annular surface of the thickened annular portions of said membrane means, and fluid means communicating with said annular closed chamber for inflating and moving said serrations of the membrane means predeterminately in a direction toward said closure member contact without disturbing the initial contact of said closure member with the outer annular surface of said thickened portion of the membrane means whereby to supplement the fluid sealing area of said contact of the closure member with said intermediate serrations of the membrane means.

2. The subject matter of claim 1, the wall thickness of said intermediate serrations being substantially uniform thoughout.

3. The subject matter of claim 1, the said fluid sealing means of said membrane means being in different planes and positioned on opposite sides of said membrane means to connect the latter means with said valve casing.

4. The subject matter of claim 1, the said closure member being ported and rotatable and of substantially cylindrical configuration, the said membrant means being arcuately curved to fit within said casing and positioned between said casing and closure member, the said membrane means surrounding said closure member port in the valve open position.

5. In a valve, a valve casing with a plurality of axially aligned ports, a reciprocally movable valve closure member therefor, seat means within the casing for predeterminately contacting the said closure member with the said seat means in fluid sealing relation, sealing means interposed between said closure member and the seat means of the said casing, the said sealing means comprising inflatable membrane means in fluid sealed relation to the said closure member having inner and outer thickened annular portions defining peripheral limits thereof, the said membrane means having a plurality of serrations with lands to contact the seat means, the latter extending annularly between said thickened annular portions substantially transversely to the central axis thereof, actuating means for effecting said fluid sealing contact predeterminately between said valve closure member and the said seat means, the said closure member in its contact with said seat means bearing aaginst outer surfaces defining respectively the said serrations and at least one of the thickened annular portions of said membrane means, and fluid supply means for moving said serrations of the membrane means predeterminately in a direction toward said closure member contact without disturbing the contact of said closure member with said thickened annular portion of the membrane means whereby to increase the effectiveness of said contact of the closure member with the serrations of the membrane means, the said actuating means including a stem member therefor connecting with said closure member and having communicating passageways cooperating with said fluid supply means to effect said movement of the serrations of the membrane means outwardly at a plurality of spaced apart locations whereby to seal said closure member in the valve closed position around said aligned ports of the casing.

(References on following page)

References Cited in the file of this patent

UNITED STATES PATENTS

| | | |
|---|---|---|
| 1,476,344 | McGee | Dec. 4, 1923 |
| 1,834,870 | Rogers | Dec. 1, 1931 |
| 2,002,062 | Howard | May 21, 1935 |
| 2,325,802 | Schmidt | Aug. 3, 1943 |
| 2,567,032 | Schmidt | Sept. 4, 1951 |
| 2,582,877 | Mekler | Jan. 15, 1952 |
| 2,911,184 | Moore | Nov. 3, 1959 |
| 2,923,522 | Keppert | Feb. 2, 1960 |
| 2,970,803 | Harza | Feb. 7, 1961 |

FOREIGN PATENTS

| | | |
|---|---|---|
| 724,308 | Germany | Aug. 22, 1942 |
| 1,114,153 | France | Dec. 12, 1955 |